Figure 1:
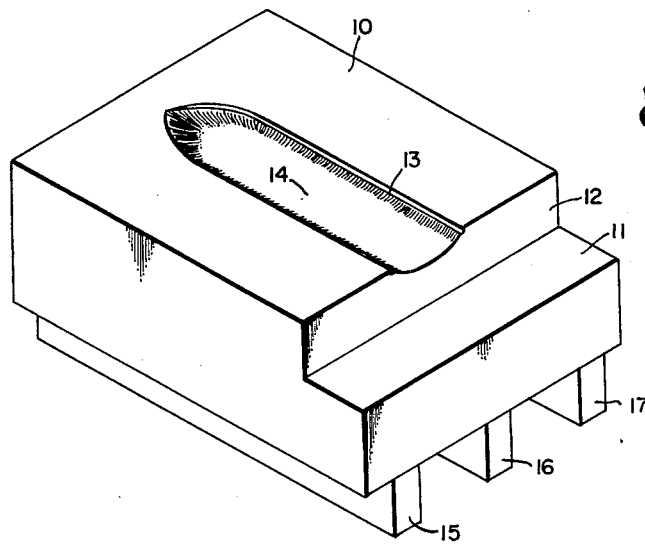

Nov. 23, 1965    E. C. FRESCH ETAL    3,218,892
METAL WORKING PROCESS
Filed April 30, 1962

Inventors
Eugene C. Fresch
Jerome Nekrin
By Anthony R. Cunnamo
ATTORNEY ated Nov. 23, 1965

3,218,892
METAL WORKING PROCESS
Eugene C. Fresch and Jerome Nakrin, both of Columbus, Ohio, assignors to The Columbus Milpar and Mfg. Company, Inc., a corporation of Ohio
Filed Apr. 30, 1962, Ser. No. 190,886
2 Claims. (Cl. 76—104)

This invention relates generally to a manufacturing process for the manufacture of cutting blades and particularly to a method and means of manufacturing high strength cutting blades from a high carbon (hard) steel stock.

The present invention finds particular utility in the bayonet or saber type of cutting blade. However, it is understood the principles herein set forth may also be applicable to other types of cutting instruments having a high strength requirement.

In the prior art manufacturing process for high strength cutting blades, the high carbon blank steel of a very general configuration is milled, ground or cut to the shape of the basic contours of the end product. The thin cutting edge is then further ground to sharpness. The process is worked by hand or requires milling or grinding blanks for accuracy. The reduction in steel by the cutting away of the blank quite naturally results in an end product having an over-all strength much less than the original blank. Further, in the process of reducing the blank to the desired shape and size, heat would be imparted to the blank causing the metal to become harder and in some instances brittle. Finally, the prior art system of reducing the blank to size is extremely slow, requires hand work and handling from one step to the next. The results of this method is that an end product is produced having less strength at a cost much greater than could be justified.

The metal working art, generally speaking, includes operations for cutting, bending, pushing or pulling the metal into a desired shape. The cutting operation includes the prior art method described above; the forming group of operations includes curling, blurring, necking and expanding; the pulling operation includes drawing; and the squeezing operation involves a compression stress or tensile strain. The last group is subdivided into sizing, swaging, coining and extrusion.

A great many of the causes for behavior and for differences in behavior in the material being worked in the tools and presses lie within the structure, in its reaction to different stresses, and treatments. To exceed the elastic limit of one piece of steel and shape it plastically without exceeding its ultimate strength, and breaking it; or to stress another piece of steel to the breaking point without damaging the steel dies which are being used to perform the operation repeatedly is a problem of structure and treatment. To this day empirical methods and experiences have sufficed in the judging of press capacities and the capabilities of the dies with the result that the art has not progressed favorably with other engineering fields.

Metals may be deformed elastically in compression or tension within certain limits, returning to their original shape when the deforming force is removed. The elastic limit of a metal measures the greatest stress per unit of area under which it will behave elastically. When metals are loaded beyond their elastic limit, they retain a permanent set or change of form. As the loading continues, the metal is deformed plastically more and more, until fracture starts. A complete break follows quickly at what is known as the ultimate strength. Ductility and malleability are qualitative terms describing the relative ability of metals to stand plastic deformation without fracturing. The hardness of metals is its resilience or resistance to deformation.

In producing an article by stamping, the metal is worked entirely beyond its elastic limit or the yield point. As the carbon content is increased, steel behaves elastically up to a higher and higher stress before it begins to yield. At the same time the amount that the metal elongates, or moves plastically, becomes less and less as the carbon content is increased.

In conventional cold-working plasticity is reduced to an extent dependent upon the severity of the operation or amount of cold-working and upon the rate at which the cold-working strain hardens the metal. When metals are permanently deformed by cold-working, they are stressed beyond their elastic limits beyond what the bonds between atoms will stand. When this occurs, a slippage or rearrangement will take place along the planes of weakness that are in the proper angular relation relative to the straining force. These are known as slip planes and metal which has been cold-worked shows slip bands. After severe cold-working, the metals—due to the slip bands—show considerable increase in hardness, and resistance to further working.

In the conventional prior art systems, it is necessary that this strain hardening be removed since it is necessary to traverse the plastic cycle several times during fabrication of the article. The removal of the strain hardening, to permit further working, is generally accomplished by annealing and recrystallization. To exceed the elastic limit of a steel blank and to shape it plastically, without exceeding its ultimate strength, or to stress the steel to a point without damaging the presses or dies, is the problem of structure and treatment not fully taught by the prior art systems.

In accordance with the general concepts of this invention, a steel blank of an exceptionally high carbon content is plastically worked far in excess of what may be considered its breaking point. The result is that an article is fabricated from a high carbon steel blank in a single operation—that is, without the intermediate processes of annealing. The primary advantage is that the article is permitted to retain the strain hardening; thusly, an article is fabricated having a hardness or strength exceeding that of the original blank from which it was formed.

Accordingly, it is a general object of the present invention to provide a new method and means of forming a high strength steel product.

Another object of the present invention is to provide a new method and means of forming a product from a high carbon content steel that does not reduce the strength thereof in its formation.

Another object of the present invention is to provide a manufactured product having a definite shape and configuration without milling, grinding, or cutting.

Another object of the present invention is to provide a manufactured cutting blade from a high carbon steel wherein the end product is of a higher strength than the original steel blank.

Another object of the present invention is to manufacture a cutting blade from a steel blank in a process that is relatively quick and inexpensive.

Still another object of the present invention is to provide apparatus to plastic work a hard steel blank that will withstand constant and continuous operation on a large scale production basis.

Other objects and features of the present invention will become apparent from the following detailed description when taken in conjunction with the drawings in which, FIG. 1 shows a stamping die, in perspective, constructed in accordance with the concepts of the present invention suitable for use in the plastic working of hard steel products.

Figure 2:
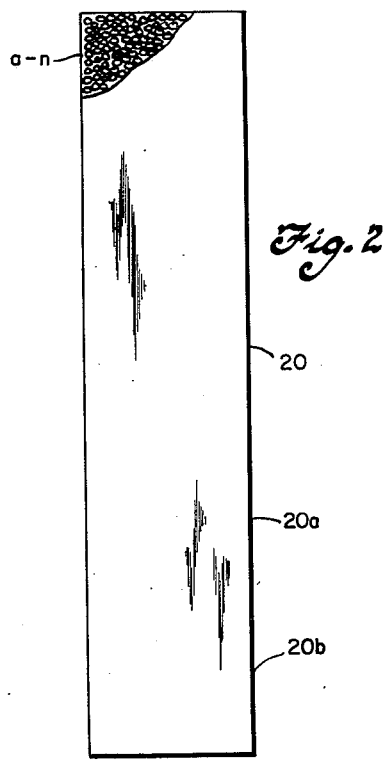
Figure 3:
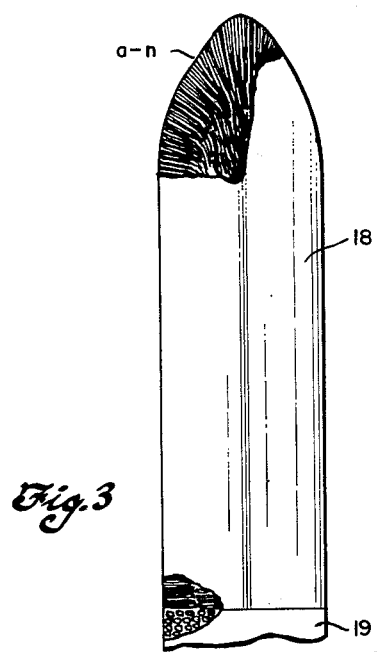

FIG. 2 illustrates the grain structure of the high carbon steel blank prior to working, and FIG. 3 illustrates the grain structure of a high carbon steel after working.

Referring now to the illustrations in the drawings, generally a die constructed in accordance with the present invention is shown in FIG. 1. The primary feature of this stamping die is that it will plastic work a steel blank having a high carbon content and be continuously in process without damage to the die or a change in dimension.

Specifically, the stamping die of FIG. 1 comprises block 10 having formed therein the cavity 14. The cavity 14 has the required sizes and shape to the end article and is adapted to receive the hard steel blank. The block 10 has a portion removed therefrom leaving right angle section formed by walls 11 and 12. In this way the formed blade or cutting section of the blank (20a of FIG. 2) is the only portion entering the die; the remainder of the blank (20b of FIG. 2) is left free from the pressure of the press.

As the pressure of the press is applied to the blank, it is compressed into its desired shape. To permit the blank to withstand the pressure, that is, to be plastic worked in the die, without fracturing the blank, the cavity 14 in the die 10 has an extended compression section 13 formed therein. This section 13 is very small relative to the over-all blank and is shown enlarged for purposes of illustration. The compression section 13 permits the metal in excess of that being compressed to free flow. To assist in this operation a lubricating fluid, such as molybdenum sulphide, is generously used. The lubricant is critical and essential to the operation.

In the plastic working of the hard steel through compression, there occurs in the process a reorientation of the grain structure into slip bands, as illustrated with reference to FIGS. 2 and 3. In FIG. 2 the steel blank has a carbon content in excess of 0.30 and may have a carbon content as high as 1.03. Prior to working the steel blank is annealed to a spheroidized state, that is the granular structure is spheroidized. The general orientation of the spheres 20a and 20n is in a direction parallel with the elongation of the blank. After the steel blank has been worked in the dies of FIG. 1, the orientation and granular structure is that shown in FIG. 3. The spheres in themselves become elongated and are reorientated in their major axes toward the edges of the cutting blade. The groups of elongated spheres now form slip bands that lend considerably to the hardness and strength of the cutting ends of the blade.

It was found that in the normal use of a stamping die in plastic working of hard steel, the die could not exceed a relatively low amount of pressure without either fracturing or damaging the die. Therefore, even if the hard metal blank would be able to stand a greater amount of working, the die doing the work was not capable of performing the operation. In the manufacture of small objects, several thousand pieces per day may be turned out; and in some instances, it is necessary that hundreds of thousands of pieces need to be produced before the cost of the die is justified. Therefore, the damage to a die wherein continuous operation is desired, necessitating the purchase of new dies, cannot be tolerated in a manufacturing process.

The stamping die utilized in the present invention has been in continuous daily operation for a considerable period of time and has not shown any indication of damage. It has been determined that a pressure of one hundred tons per square inch could be applied to the die, having a hard steel workpiece thereon, without the die giving or becoming damaged. The primary uniqueness of the die lies in the design of the form of the cavity 14 with the expansion section 13 and of equal importance the backup rolls 15, 16, and 17.

In the process of the present invention a cutting blade, or other article, is produced having a hardness at its utility point greater than that of the original blank. With this process, a blank of less hardness may be utilized and still produce a cutting blade of a hardness greater than necessary for its intended purposes.

Although we have shown certain and specific embodiments and certain steps are described, it is understood that modifications may be had to the present invention without departing from its true spirit and scope.

What is claimed is:

1. A process for the manufacture of a cutting blade from a steel blank having a carbon content in the range of 0.30 to 1.03% comprising annealing said blank to a spheroidized state, lubricating said blank for cold working thereof, permitting a free metal flow under continuously applied shaping pressure of the order of 100 tons per square inch to said blank to reorient the spheroidized granular structure into elongated grains having their major axes in the direction of the utility of said cutting blade.

2. The invention of claim 1 wherein the cutting blade has its granular structure reoriented into slip bands.

References Cited by the Examiner
UNITED STATES PATENTS

| | | | |
|---|---|---|---|
| 1,454,387 | 5/1923 | Lashar | 76—104 |
| 1,543,880 | 6/1925 | Sheehan | 76—104 |
| 1,578,791 | 3/1926 | Wood | 76—104 |
| 2,061,780 | 11/1936 | Short. | |
| 2,486,282 | 10/1949 | Hoffman et al. | 148—12 |
| 2,987,429 | 6/1961 | Smith | 148—12 |

OTHER REFERENCES

"Fundamentals of the Working of Metals," Sachs, 1954.

"Metals Handbook," A.S.M., 1961, vol. 1, page 96 and page 425.

WHITMORE A. WILTZ, *Primary Examiner.*